(12) United States Patent
Reymann et al.

(10) Patent No.: US 6,422,070 B2
(45) Date of Patent: Jul. 23, 2002

(54) DEVICE FOR MEASURING THE MASS OF A FLOWING MEDIUM

(75) Inventors: Klaus Reymann, Gerlingen; Dieter Tank, Eberdingen; Uwe Konzelmann, Asperg; Henning Marberg, Weil der Stadt, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/866,721

(22) Filed: May 30, 2001

Related U.S. Application Data

(63) Continuation of application No. 08/545,583, filed as application No. PCT/DE95/00184 on Feb. 15, 1995.

(30) Foreign Application Priority Data

Mar. 4, 1994 (DE) .......................................... 44 07 209

(51) Int. Cl.⁷ ................................................ G01F 1/68
(52) U.S. Cl. ........................ 73/118.2; 73/202; 73/202.5
(58) Field of Search .............................. 73/118.2, 202, 73/202.5, 204.22

(56) References Cited

U.S. PATENT DOCUMENTS

| | | | | |
|---|---|---|---|---|
| 4,709,581 A | | 12/1987 | Nishimura et al. | |
| 4,914,947 A | | 4/1990 | Davidson | |
| 5,563,340 A | * | 10/1996 | Clowater et al. | 73/118.2 |
| 5,712,425 A | * | 1/1998 | Hecht et al. | 73/118.2 |
| 5,948,975 A | * | 9/1999 | Mueller et al. | 73/118.2 |
| 6,148,663 A | * | 11/2000 | Stahl et al. | 73/118.2 |
| 6,272,920 B1 | * | 8/2001 | Tank et al. | 73/118.2 |
| 6,298,720 B1 | * | 10/2001 | Mueller et al. | 73/118.2 |

* cited by examiner

*Primary Examiner*—Eric S. McCall
(74) *Attorney, Agent, or Firm*—Ronald E. Greigg

(57) ABSTRACT

Devices for measuring the mass of a flowing medium using a temperature-sensitive measuring element have the disadvantage that considerable measuring errors may occur in the event of a pulsating flow characterized by flow fluctuations. In order to counteract these measuring errors, the device (1) possesses an axially extending measuring duct (33), in which a temperature-sensitive measuring element (20) is accommodated. The measuring duct (33) extends from the inlet mouth (36) to a deflecting duct (34), out of which the flowing medium flows out from an outlet orifice (46) without any axial distance from the inlet mouth (36) and radially underneath the latter. The invention is provided for measuring the mass of a flowing medium, in particular for measuring the intake air mass of internal combustion engines.

20 Claims, 2 Drawing Sheets

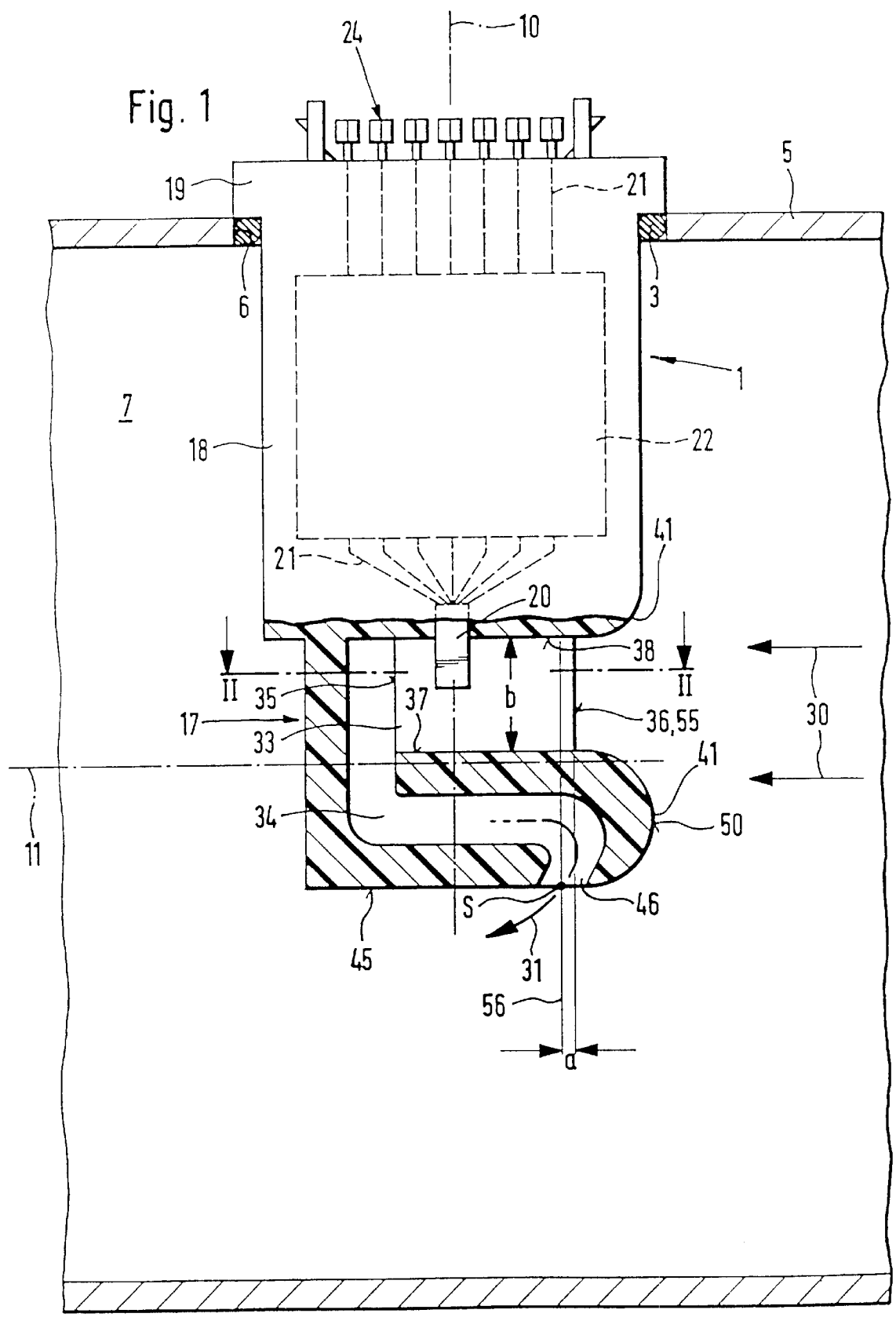

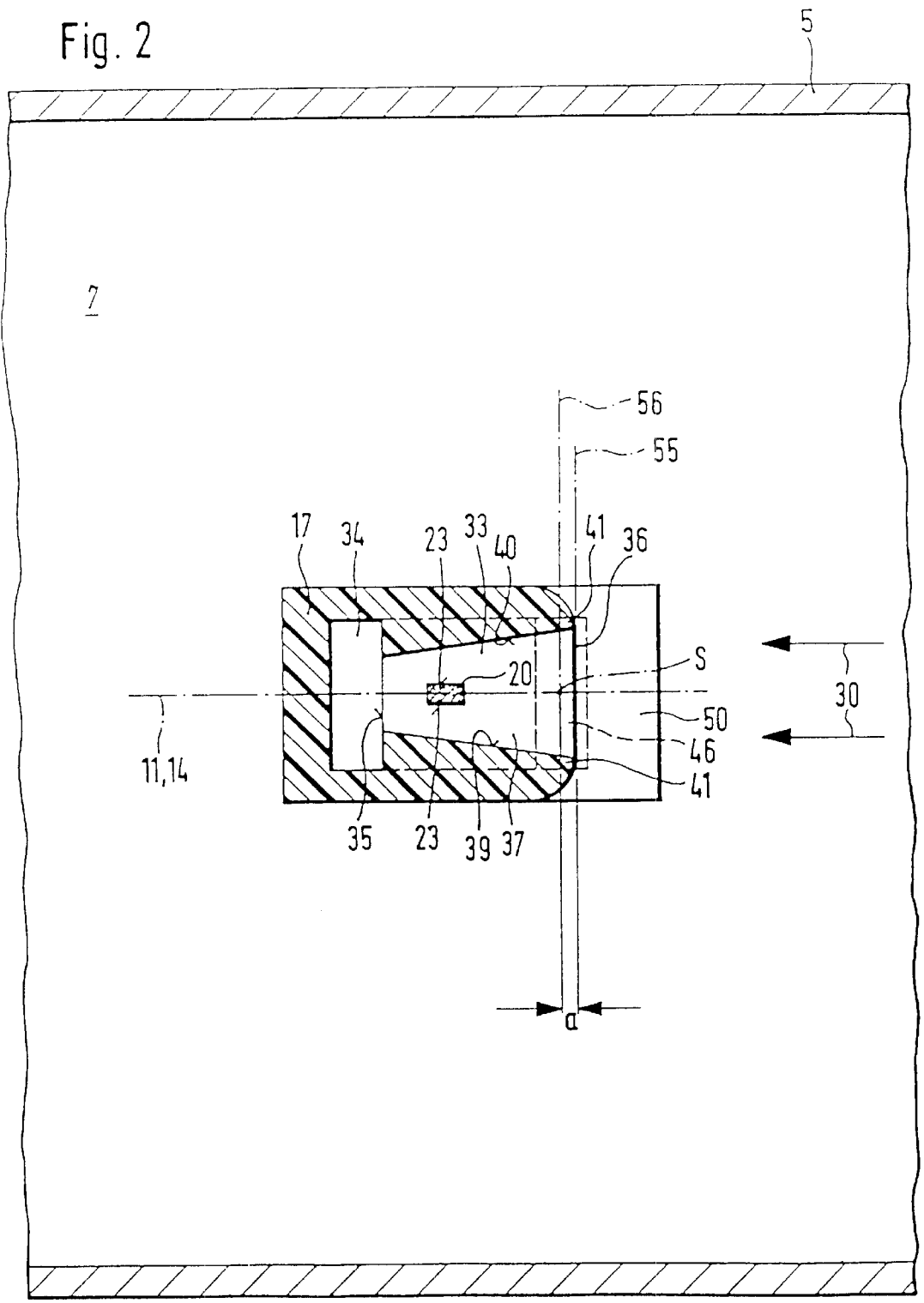

DEVICE FOR MEASURING THE MASS OF A FLOWING MEDIUM

This application is a continuation of Ser. No. 08/545,583, filed Nov. 3, 1995 which is a 371 of PCT/DE95/00184 filed Feb. 15, 1995.

PRIOR ART

The invention relates to a device for measuring the mass of a flowing medium. There is already a known device (EP 0,547,595 A2) which possesses a tubular inner housing and a tubular outer housing and in which a temperature sensitive measuring element is accommodated in a central measuring duct of the inner housing, said measuring duct extending in the axial direction in the inner housing and being open on one side, in order to determine the mass of a flowing medium, in particular the intake air mass of an internal combustion engine. The device is provided as a mountable intermediate piece, for example of-an intake conduit through which the internal combustion engine can suck in air from the environment via an air filter. The tubular inner housing connected to the outer housing by means of a plurality of ribs possesses, furthermore, a bypass duct which is cut out from the inner housing and is arranged concentrically to the measuring duct and which, taking the form of an annular gap, surrounds the measuring duct with a smaller axial extension. A part stream of the medium flowing in the outer housing flows from an inlet mouth coaxial relative to the outer housing first into the measuring duct and flows round the temperature-sensitive measuring element arranged in the region of its downstream end, after which the flowing medium, reversing its direction of flow, flows from the measuring duct into the bypass duct. The medium flowing upstream in the bypass duct leaves the latter through a slit-shaped outlet orifice cut out on the circumference of the inner housing relatively far downstream of the inlet mouth and is mixed again with the medium flowing past between the inner housing and the outer housing. However, the design of the device as a mountable intermediate piece with an inner housing and with an outer housing necessitates a considerable overall size, so that the device is suitable to only a limited extent for confined conditions of installation, particularly in the engine region of a motor vehicle.

In the case of an internal combustion engine, as a result of the opening and closing of the inlet valves of the individual cylinders there occur considerable fluctuations or pulsations of the flow, the intensity of which depends on the intake frequency of individual pistons or on the rotational speed of the internal combustion engine. The pulsations of the flow are propagated from the inlet valves via the intake conduit as far as the measuring element in the inner housing and beyond this. The pulsations cause the measuring element, as a result of thermal inertia and directional insensitivity, depending on the intensity of the pulsations, to provide a measurement result which deviates considerably from the flow velocity prevailing on average in the measuring duct and from the intake air mass of the internal combustion engine which can be calculated from it.

ADVANTAGES OF THE INVENTION

In contrast to this, the advantage of the device according to the invention for measuring the mass of a flowing medium is that a uniformly accurate measurement result can be achieved virtually independently of a fluctuating or pulsating flow.

Advantageous developments and improvements of the device are specified herein after. It is Particularly advantageous that the device is distinguished by a compact design and small overall size and therefore requires only a small installation space. The device is therefore particularly suitable as a pluggable component especially for confined conditions of installation, for example in the engine region of a motor vehicle.

BRIEF DESCRIPTION OF THE DRAWINGS

An exemplary embodiment of the invention is represented in simplified form in the drawing and is explained in more detail in the following description.

FIG. 1 shows a partial sectional representation of a side view of a device designed according to the invention; and FIG. 2 shows a section along the line II—II in FIG. 1.

DETAILED DESCRIPTION OF THE EXEMPLARY EMBODIMENT

FIG. 1 shows a partial sectional representation of a side view of a device, designated by 1, which serves for measuring the mass of a flowing medium, particularly the intake air mass of internal combustion engines. The device 1 preferably has a slender cuboid shape extending elongately radially in the direction of a longitudinal axis 10 and is introduced, for example pluggably, into an orifice 6 of an intake conduit 7, said orifice 6 being cut out from a wall 5. The device 1 is sealed off by means of a sealing ring 3 in the wall 5 and is fixedly connected to the latter, for example by means of a screw connection not represented in any more detail. The wall 5 represented by hatching is par t of the, for example, cylindrically designed intake conduit 7, through which the internal combustion engine can suck in air from the environment via an air filter not shown in any more detail. The wall 5 of the intake conduit 7 limits a flow cross section which, in the case of a cylindrical intake conduit 7, has approximately a circular cross section, in the middle of which extends in the axial direction, parallel to the wall 5, a mid-axis 11 oriented perpendicularly to the longitudinal axis 10. The device 1 projects into the flowing medium by means of a part designed below as a measuring part 17, the measuring part 17 being divided symmetrically by the mid-axis 11, for example approximately in the middle of the intake conduit 7, so that the medium can flow against a temperature sensitive measuring element 20 accommodated in the measuring part 17, if possible without any disturbing marginal influences from the wall 5. In the exemplary embodiment shown in FIGS. 1 and 2, the medium flows from right to left, the direction of flow being identified by corresponding arrows 30.

The device 1 is composed, in one piece, of the measuring part 17, of a carrier part 18 and of a holding part 19 and is produced, for example, from plastic by the plastic injection molding technique. The measuring element 20 is designed, for example, in the form of a plate-shaped ceramic substrate and, as is to be taken from the prior art, for example from German Offenlegungsschrift 3,844,354, possesses one or more temperature dependent resistors which are applied to the plate-shaped ceramic substrate in the form of resistive films, so called hot-film resistors. It is also possible, as proposed, for example, in German Patent Application P 4,338,891, to design the measuring element 20 as a micromechanical component which has a dielectric membrane. The individual resistive films of the measuring element 20 are electrically connected, by means of connecting leads 21 extending inside the device 1, to an electronic evaluation circuit 22 which is represented by broken lines in FIG. 1 and which contains, for example, a bridge-like resistance measuring circuit. The evaluation circuit 22 is accommodated, for example, in the carrier part 18 or in the holding part 19 of the device 1. By means of a plug connection 24 provided on the holding part 19, electrical signals supplied by the evaluation circuit 22 can be fed for evaluation, for example, to a further electronic control unit which controls inter alia functions of the electronic idling control or engine power control of the internal combustion engine. A detailed description of the function and construction of temperature-dependent measuring elements is dispensed with, since the average person skilled in the art can take this from the prior art.

As represented in FIG. 2, which is a sectional representation along a line II—II in FIG. 1, the measuring part 17 of the device 1 has a cuboid shape and has a measuring duct 33 extending in the axial direction in the measuring part 17 and an S-shaped deflecting duct 34. The measuring duct 33 extends axially in the measuring part 17 from an inlet mouth 36 having, for example, a rectangular cross section as far as a mouth 35 and is limited by an upper face 38 further from the mid-axis 11 and a lower face 37 nearer to the mid-axis 11 and by two side faces 39, 40, which do not extend as far forward as upper face 38 and lower face 37. In the exemplary embodiment of FIG. 1 the measuring duct 33 is arranged eccentrically relative to the mid-axis 11. It is also possible to arrange the measuring duct 33 centrically or in the region of the mid-axis 11 of the intake conduit 7. The plate-shaped measuring element 20 is oriented in the measuring duct 33 with its greatest extension radially in the direction of the longitudinal axis 10 and is divided symmetrically by the latter. The measuring element 20 is held with its narrow end on one side in the carrier part 18 on the upper face 38, so that the medium flows round said measuring element 20 together with its two side faces 23 in a manner approximately parallel to the midaxis 11. As represented in FIG. 2, the side faces 39, 40 of the measuring duct 33 extend obliquely relative to a plane 14 spanned by the mid-axis 11 and the longitudinal axis 10 and form an acute angle with said plane 14, so that the measuring duct 33 narrows axially in the direction of flow 30, in order to open into the deflecting duct 34 with a minimum cross section at the mouth 35.

The narrowing of the measuring duct ensures that a uniform parallel flow as undisturbed as possible prevails in the region of the measuring element 20.

In order to avoid flow breakaways in the region of the inlet mouth 36, the latter possesses rounded edge faces 41. As can clearly be seen by comparing FIGS. 1 and 2, the side faces 39 and 40 do not extend as far in the upstream direction of the axis 11 as do the lower and upper faces 37 and 38. The forward extent of the side faces, as shown in FIG. 2, define the inlet mouth 36. The deflecting duct 34 has a rectangular cross section which corresponds approximately to the cross-sectional area of the inlet mouth 36 of the measuring duct 33, so that the flow cross section increases abruptly at the mouth 35 between the measuring duct 33 and the deflecting duct 34. The axially flowing medium passes from the measuring duct 33 into the approximately S-shaped deflecting duct 34 and flows radially out of an outlet orifice 46 in the direction of an arrow 31 marked in FIG. 1, in order thereafter to mix again with the medium flowing past around the device 1. Like the deflecting duct 34, the outlet orifice 46 possesses, for example, a rectangular cross section and is provided on a lower outer face 45 of the measuring part 17, said lower outer face being oriented parallel to the mid-axis 11. In FIG. 1, a front face 50 of the measuring part 17, said front face confronting the flow 30, is adjacent transversely to the lower outer face 45 on the right of the rectangular orifice 46 and leads in rounded form upstream of the inlet mouth 36 from the lower outer face 45 to the lower face 37 of the measuring duct 33 as far as the inlet mouth 36.

According to the invention, the inlet mouth 36 of the measuring duct 33 and the outlet orifice 46 of the deflecting duct 34 are designed to be located radially one under the other, so that an axial distance, designated by "a" in FIGS. 1 and 2, is only extremely small or is absent. The axial distance "a" is determined by an entry plane 55, spanned by the inlet mouth 36, to a centroid plane 56 passing through a centroid s of the outlet orifice 46 parallel to the entry plane 55. In the case, for example, of a rectangular cross-section area of the outlet orifice 46, the centroid S is located at the intersection point of the median. As is known, the temperature-sensitive measuring element 20 is heated to an excess temperature higher than that of the flowing medium and, mainly as a result of convection, transmits heat to the flowing medium, the heat quantity being dependent on the flow velocity occurring in the measuring duct 33, so that the heating voltage or heating current necessary, for example, for maintaining the excess temperature is a measure of the flow velocity in the measuring duct 33 and of the intake air mass calculable from this in the intake conduit 7. Because the convective heat transmission is based on non-linear physical laws, the measuring element 20 has a non-linear characteristic, as a result of which, in the case of a pulsating flow and a pulsating heat transmission to the flowing medium, the measurement result does not correspond to the actual time-averaged flow velocity in the measuring duct 33, but deviates considerably from this, depending on the intensity of the pulsations, as a consequence of a thermal inertia of the measuring element 20. Because the outlet orifice 46 is arranged radially underneath the inlet mouth 36 without or at only a short axial distance "a", it is possible that the pressure changes both at the inlet mouth 36 and at the outlet orifice 46, which are triggered during a pulsating flow, cancel one another out in terms of their effect on the deflecting duct 34, so that a uniform velocity independent of these pressure changes prevails in the deflecting duct 34. The result of this effect of an air column flowing at virtually constant velocity in the deflecting duct 34 is that the medium also flows onto the measuring element 20 in the measuring duct 33 at a constant velocity in a manner uninfluenced by the pressure changes of the pulsations and their intensity and an exact measurement result can be established. However, this effect occurs only if the outlet orifice 46 is designed radially underneath the inlet mouth 36 at a minimal axial distance "a". The distance "a" is itself dependent on the choice of the cross-sectional area of the inlet mouth 36 or on the cross-sectional area of the measuring duct 33 and should be at most approximately 50% of a minimum dimension b at the inlet mouth 36. The minimum dimension b of the inlet mouth 36 is marked accordingly in the exemplary embodiment in Figure I and corresponds to the radial distance from the surface 38 of the carrier part 18 to the lower face 37 of the measuring duct 33. If the measuring duct 33 is, for example, cylindrical with a circular cross section, the minimum dimension b corresponds to the diameter of the circular measuring duct 33 at the inlet mouth 36.

The forgoing relates to preferred exemplary embodiments of the invention, it being understood that other variants and embodiments thereof are possible within the spirit and scope of the invention, the latter being defined by the appended claims.

We claim:

1. A device for measuring a mass of a flowing medium in an air intake of an internal combustion engine, which comprises a temperature-sensitive measuring element, around which the flowing medium flows and which is arranged in a measuring duct running in the device and extending in an axial direction from an inlet mouth of the measuring duct to a deflecting duct, into which the medium flowing out of the measuring duct flows and which flows out of an outlet orifice of the deflecting duct, an entry plane (55) defined by the cross-section of the inlet mouth (36) of the measuring duct (33), said entry plane extends through the outlet orifice (46) of the deflecting duct (34), wherein the inlet mouth (36) of the measuring duct (33) has a rectangular cross-section and the measuring duct has a rectangular cross section which narrows in an axial direction.

2. The device as claimed in claim 1, wherein an axial distance (a) from the entry plane (55) of the inlet mouth (36) to a centroid plane (56) limited by a centroid (S) of the outlet orifice (46) is at most approximately 50 percent of a minimum dimension (b) of a cross section of the inlet mouth (36).

3. The device as claimed in claim 1, wherein there is a measuring part (17) of a cuboid shape.

4. The device as claimed in claim 1, wherein the outlet orifice (46) of the deflecting part (34) has a rectangular cross section.

5. The device as claimed in claim 1, wherein the inlet mouth (36) of the measuring duct (33) has rounded edge faces (41).

6. The device as claimed in claim 1, wherein the measuring element (20) is designed in the form of a micromechanical component.

7. The device as claimed in claim 1, in which said device (1) is designed as a pluggable component.

8. A device for measuring a mass of a flowing medium in an air intake of an internal combustion engine, which comprises:

a temperature-sensitive measuring element, around which the flowing medium flows and which is arranged in a measuring duct running in the device and extending in an axial direction from an inlet mouth of the measuring duct to a deflecting duct, into which the medium flowing out of the measuring duct flows and which flows out of an outlet orifice of the deflecting duct, said measuring duct being formed by a top wall, a bottom wall, and two side walls, each having a forward extent, said inlet mouth (36) of the measuring duct (33) being formed in an entry plane (55) which includes the forward extent of the two side walls, the entry plane (55) being defined by the cross-section of the inlet mouth (36) of the measuring duct (33) and said entry plane extends through the outlet orifice (46) of the deflecting duct (34).

9. The device as claimed in claim 8, wherein an axial distance (a) from the entry plane (55) of the inlet mouth (36) to a centroid plane (56) limited by a centroid (S) of the outlet orifice (46) is at most approximately 50 percent of a minimum dimension (b) of a cross section of the inlet mouth (36).

10. The device as claimed in claim 8, wherein there is a measuring part (17) of a cuboid shape.

11. The device as claimed in claim 8, wherein the inlet mouth (36) of the measuring duct (33) has a rectangular cross section.

12. The device as claimed in claim 11, wherein the measuring duct (33) has a rectangular cross section and narrows in the axial direction.

13. The device as claimed in claim 8, wherein the outlet orifice (46) of the deflecting part (34) has a rectangular cross section.

14. The device as claimed in claim 8, wherein the inlet mouth (36) of the measuring duct (33) has rounded edge faces (41).

15. The device as claimed in claim 8, wherein the measuring element (20) is designed in the form of a micromechanical component.

16. The device as claimed in claim 8, in which said device (1) is designed as a pluggable component.

17. A device for measuring a mass of a flowing medium, which device comprises:

a temperature-sensitive measuring element, around which the flowing medium flows in a direction, and which measuring element is arranged in a measuring duct being formed by a top face, a bottom face, and two side faces, each having a forward extent in a direction opposite to the direction of flow of the flowing medium, with the forward extent of the two side faces being less than the forward extent of the top and bottom faces, the forward extent of the two side faces defining an entry plane, the measuring duct extending from the entry plane to a deflecting duct which includes an outlet orifice, wherein the medium flowing out of the measuring duct flows into the deflecting duct and then flows out of the outlet orifice of the deflecting duct, the deflecting duct being arranged such that the entry plane passes through the outlet orifice.

18. The device as claimed in claim 17, wherein the entry plane includes an entry mouth which is bounded by the top, bottom and side faces of the measuring duct, and an axial distance (a) from the entry plane (55) to a centroid plane (56) limited by a centroid (S) of the outlet orifice (46) is at most approximately 50 percent of a minimum dimension (b) of a cross section of the inlet mouth (36).

19. The device as claimed in claim 18, wherein the inlet mouth (36) of the measuring duct (33) has a rectangular cross section.

20. The device as claimed in claim 17, wherein the measuring duct (33) has a rectangular cross section and narrows in the axial direction.

* * * * *